US007363285B2

(12) United States Patent
Kalyanaraman et al.

(10) Patent No.: US 7,363,285 B2
(45) Date of Patent: Apr. 22, 2008

(54) NETWORK MANAGEMENT AND CONTROL USING COLLABORATIVE ON-LINE SIMULATION

(75) Inventors: Shivkumar Kalyanaraman, Albany, NY (US); Boleslaw K Szymanski, Newtonville, NY (US); Kenneth Vastola, Schenectady, NY (US); Ye Tao, Troy, NY (US); David Harrison, Troy, NY (US); Bin Mo, Troy, NY (US); Biplab Sikdar, Troy, NY (US); Jingjie Jiang, Troy, NY (US)

(73) Assignee: Rennselaer Polytechnic Institute, Troy, NY (US)

( * ) Notice: Subject to any disclaimer, the term of this patent is extended or adjusted under 35 U.S.C. 154(b) by 499 days.

(21) Appl. No.: 10/149,207

(22) PCT Filed: Dec. 15, 2000

(86) PCT No.: PCT/US00/33949

§ 371 (c)(1),
(2), (4) Date: May 12, 2003

(87) PCT Pub. No.: WO01/44956

PCT Pub. Date: Jun. 21, 2001

(65) Prior Publication Data

US 2006/0149524 A1 Jul. 6, 2006

(51) Int. Cl.
*G06F 17/30* (2006.01)
*G06F 7/62* (2006.01)
*G06F 13/10* (2006.01)
*G06G 17/50* (2006.01)

(52) U.S. Cl. .................. 707/2; 707/21; 707/13
(58) Field of Classification Search .............. 703/2, 703/13, 14, 21; 709/220, 226; 707/2
See application file for complete search history.

(56) References Cited

U.S. PATENT DOCUMENTS

| 4,517,637 | A | * | 5/1985 | Cassell ................ 700/9 |
| 5,179,527 | A | | 1/1993 | Lawrenz |
| 5,557,748 | A | * | 9/1996 | Norris ................ 709/220 |
| 5,598,532 | A | * | 1/1997 | Liron ................ 703/2 |
| 7,124,101 | B1 | * | 10/2006 | Mikurak ................ 705/35 |

OTHER PUBLICATIONS

Reeves et al, "A Multiple Subsystem Simulator of Processor Scheduling", Proceedings of the 3rd symposium on simulation of computer systems ANSS '75, Aug. 1975, pp. 129-138.*

* cited by examiner

*Primary Examiner*—Uyen Le
(74) *Attorney, Agent, or Firm*—Dickstein Shapiro LLP (57) ABSTRACT

A collaborative on-line simulation system and method to provide automated and pro-active control functions for computer network. In a wide area network, clients communicate through one or several nodes (108). Each node (108) contains routers which include control plane (202) and data plane (204). Collaborative on-line simulators (206) are interfaced to the network nodes (108) and continuously monitor the surrounding network conditions, communicate with other simulators and execute collaborative on-line simulation. Based on the simulation results, the on-line simulators (206) continuously tune selected network parameters to a more efficient operation point to fit the current network conditions.

11 Claims, 6 Drawing Sheets

NETWORK MANAGEMENT AND CONTROL USING COLLABORATIVE ON-LINE SIMULATION

BACKGROUND OF THE INVENTION

I. Field of the Invention

The present invention generally relates to computer network data management and control. In particular, the present invention relates to providing a system and method to improve computer network control by providing real-time tuning of the network for better performance.

II. Description of the Related Art

As the Internet and other available global network data transfer mechanisms become increasingly in demand, network traffic over these data networks has become problematic. The number of data packet losses, requiring packet re-transmission, as well as the failure of network components has caused networks to experience reduced data transfer rates and, in many cases, network failure due to inefficient network management. Network management involves the collection of data from the network using protocols like SNMP. There are few tools that innovatively interpret this data to predict network faults.

Conventional network simulators are used for network design, and in some cases network planning, in order to design more efficient networks to handle today's increasing demands. These conventional simulators are not used for on-line network control, but rather run in an experimental setting using a representative sample of the network data or a model of the network structure to develop better protocols and mechanisms to transfer data. In addition, conventional simulators are not efficient.

These conventional simulators are now becoming less efficient because today's networks data loads and operating conditions vary greatly over time. In order to maintain a more efficient network, there is a need for a mechanism to configure computer networks by using live data where changes in the configuration can be implemented in real-time.

SUMMARY OF THE INVENTION

The present invention provides a collaborative on-line simulation system and method to provide automated and pro-active control functions for computer networks. The system and method introduce autonomous on-line simulators into local networks. These autonomous on-line simulators continuously monitor the surrounding network conditions, collect relevant network parameter information, communicate with other simulators and execute collaborative on-line simulation. Based on the simulation results, the on-line simulators then continuously tune selected network parameters to an efficient operation point to fit the current network conditions.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

Figure 1:
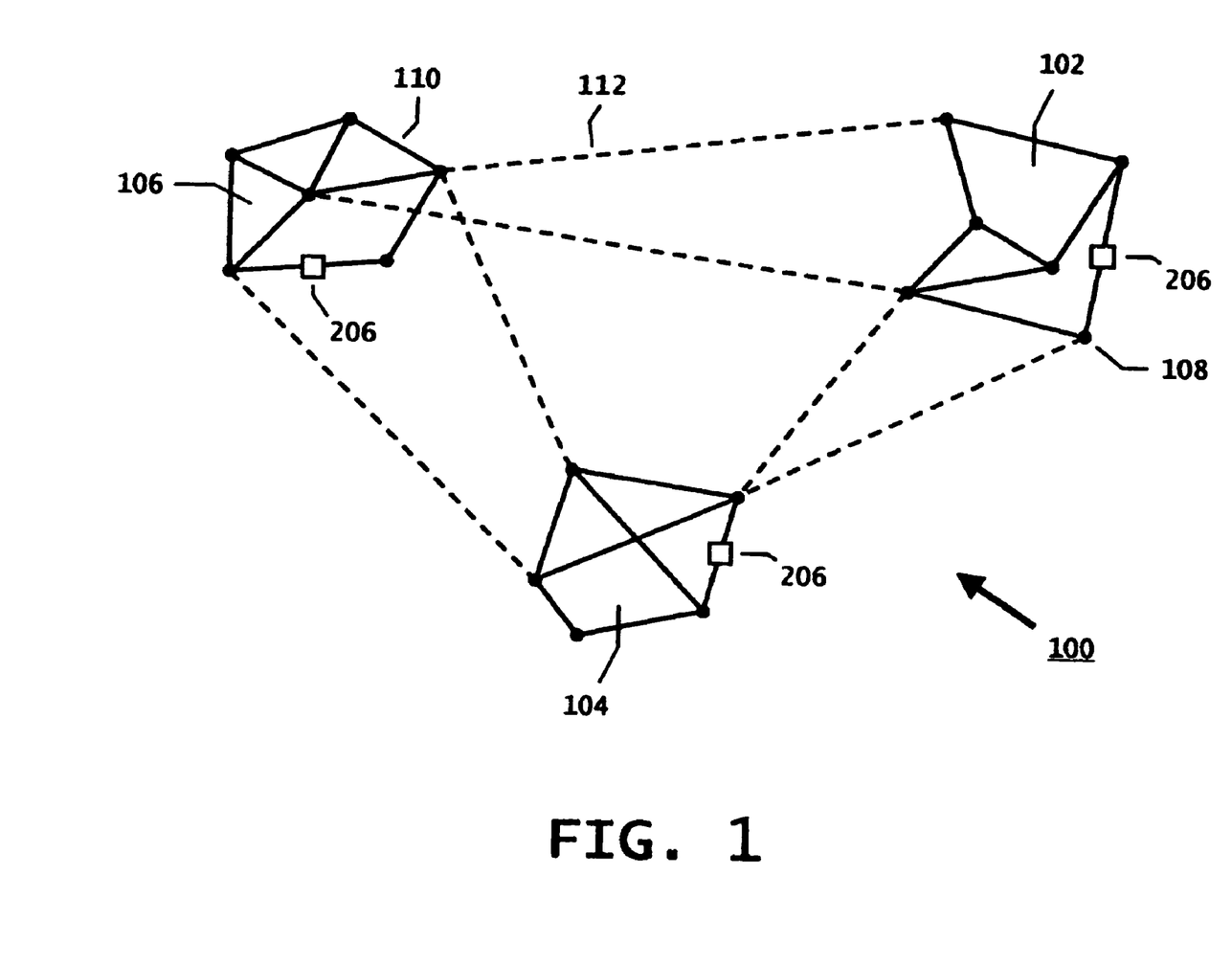
FIG. 1 illustrates a model of network nodes of a wide area computer network.

Referring now to the drawings, where like reference numerals designate like elements, there is shown in FIG. 1 a wide area network 100 for use in various applications, i.e. communications, Internet web page hosting, etc., including local networks 102, 104 and 106. Each of the local networks 102, 104, 106 include at least one server containing processors, databases, mainframes and other equipment used to distribute data to multiple clients, the users, connected by network nodes 108 through inter-connections 110 and 112. The clients exchange data amongst clients within the same local area network 102, 104 and 106 as well as with those in other local networks 102, 104 and 106 through one or several nodes 108. The nodes 108 are inter-connected to conventional wide area network backbone hardware/software. For example the wide area network can be the Internet.

Figure 2:
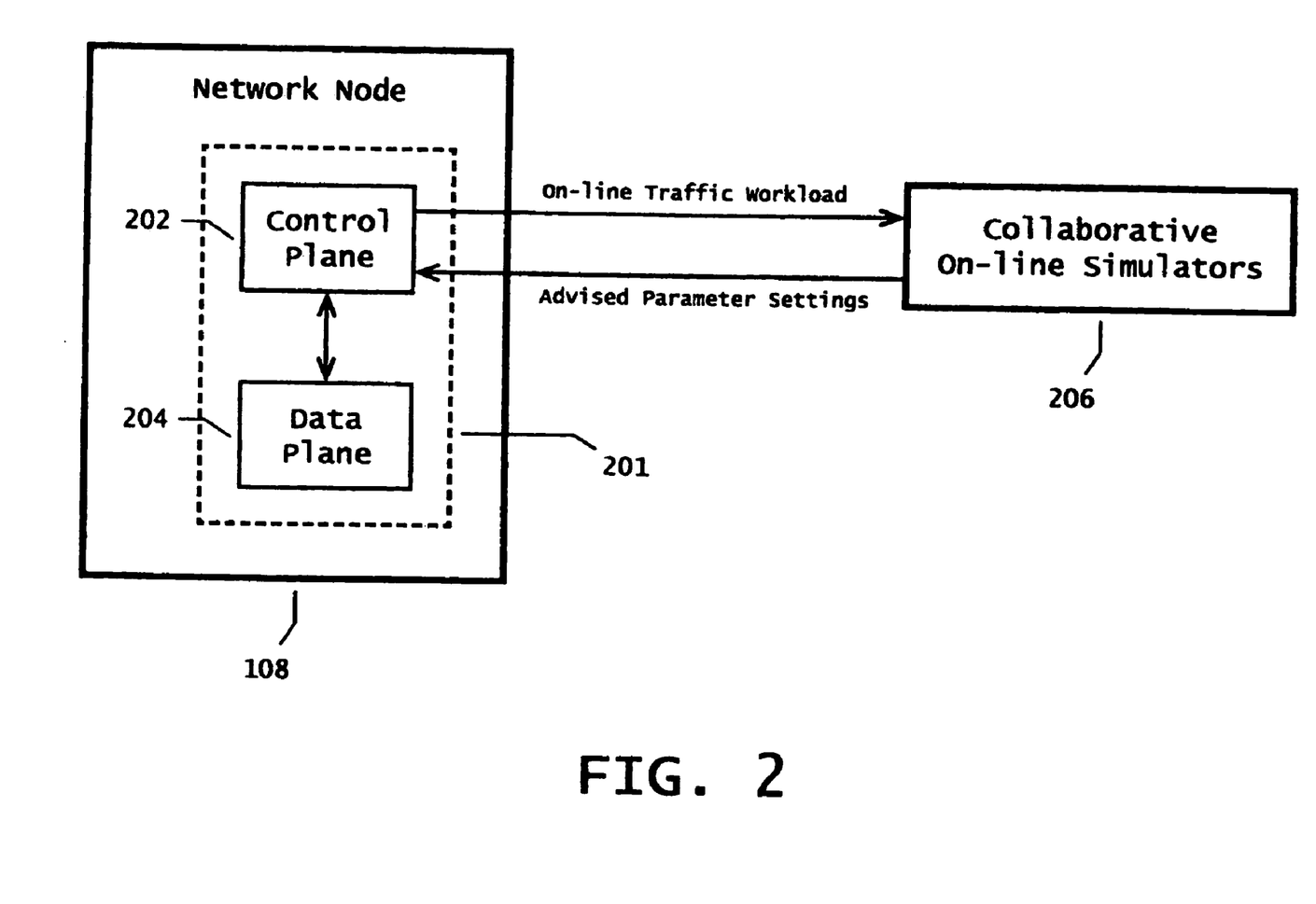
FIG. 2 illustrates a network node of a local area network of FIG. 1 interfaced to the collaborative on-line simulation system of the present invention.

As shown in FIG. 2, each network node 108 contains routers 201 which include a control plane 202 and data plane 204. The control plane 202 and data plane 204 are essentially two separate communication paths used to pass control data, where the data is traveling (protocol information), and the data itself respectively. Data is transmitted on the data plane 204 and control signals for network parameters (e.g. protocol parameters) are transmitted on the control plane 202. The control plane 202 and data plane 204 are connected amongst the several network nodes 108 through inter-connections 110 and 112 to form local networks 102, 104, 106 and ultimately a wide area network 100.

Collaborative on-line simulators 206 are interfaced to the network nodes 108 within the local networks 102, 104 and 106. The on-line simulators 206 continuously monitor the surrounding network conditions, collect the relevant information, e.g. on-line protocol parameters through on-line traffic, and exchange information with other simulators by sending information, including advised parameter setting along line 212 through control plane 202. Based on the information received, simulations are executed by the on-line simulators 206 and parameter search methods are used to evaluate the results of the simulations and search for better network parameters.

The use of simulators as well as the use of various types of simulations by the simulators are well known in the art. However, conventionally the results of these simulations are not used to change network parameters in real-time because the results would be unreliable due the changing conditions of the wide area network 100 and the large number of network node 108 experiencing different conditions. The present invention uses conventional simulations but enables the each on-line simulators 206 to use input from the output (results) of another on-line simulator 206 to perform the simulations. In this way the results of each individual on-line simulator 206 are more reliable because each result based upon current and future network conditions. Thus, the present invention allows the network parameters to continuously change in real-time and have a net overall improvement on the wide area network 100. Thus, a dynamic and automatic network control can be achieved. Note that the above on-line simulators 206 interact with the control plane 202. Therefore, the on-line simulators 206 actually accomplish a second-order control over the wide area network 100. In other words, the on-line simulation merely prescribes parameters required for the operation of network protocols and does not interfere with their normal operation in any other way.

Figure 3:
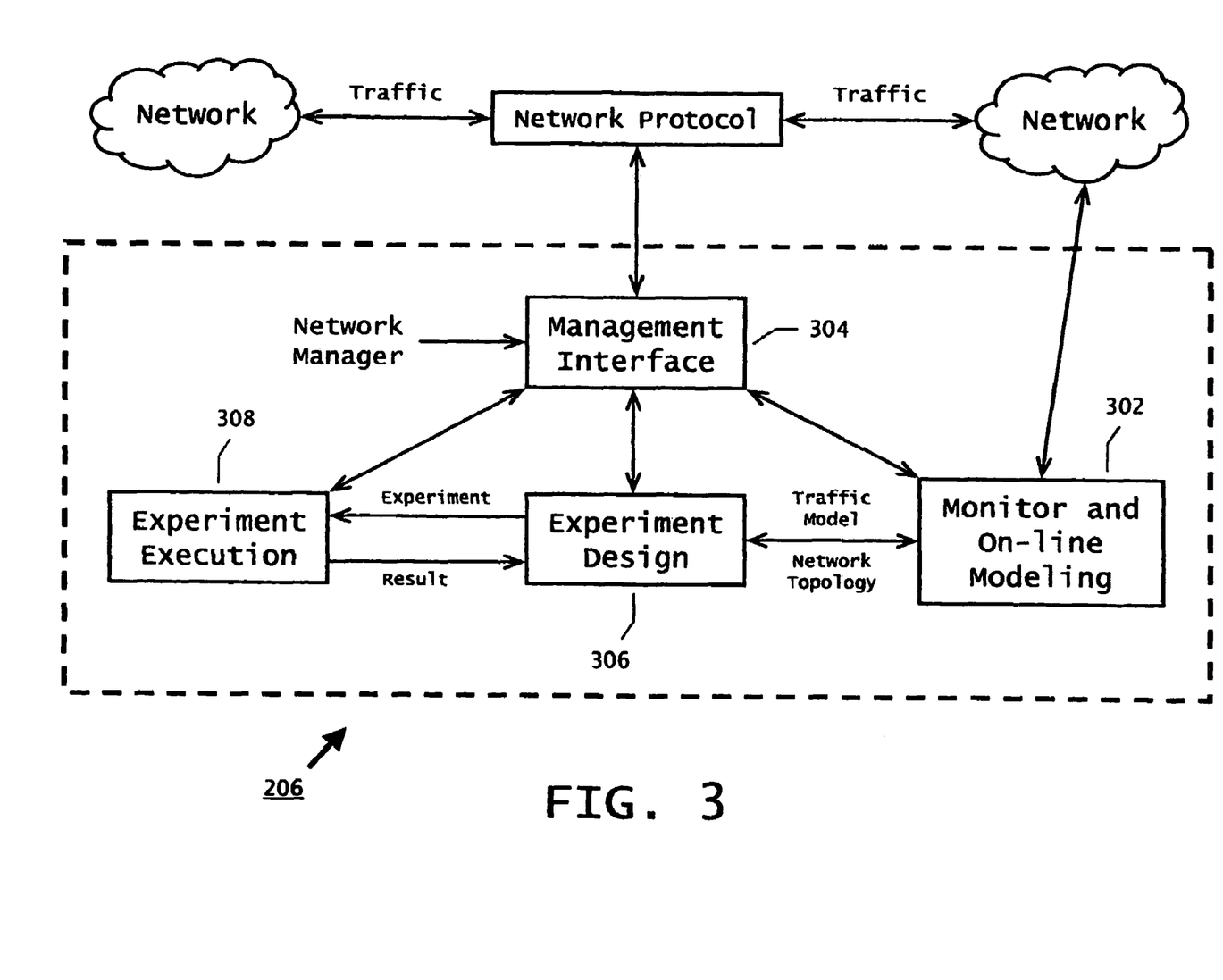
FIG. 3 illustrates the structure of the collaborative on-line simulation system of FIG. 2.

FIG. 3 is a block diagram illustrating the architecture of the collaborative on-line simulators 206. Each on-line simulator 206 includes a monitor and modeling unit 302, experiment design unit 306, management interface unit 304 and experiment execution unit 308. This above units may be implemented in software and executed at network nodes 108.

The monitor and on-line modeling unit 302 continually collects information about the local network (e.g., network topology, traffic conditions, etc.) and tries to build the most updated network model to represent current network conditions for use during simulation. The management interface unit 304 is the control center of the on-line simulator 206. The management interface unit 304 controls and synchronizes the operation of all the other units within the on-line simulator 206 while serving as an interface of the on-line simulator 206 with the network nodes 108 through which it is connected along lines 110 and 112 (FIG. 1). The experiment design unit 306 is responsible for setting up simulation experiments with appropriate search techniques (explained below), and analyzing the results of the simulation experiments to perform further searches to find more efficient network parameter settings, if necessary. The experiment execution unit 308 executes the simulations received from the experiment design unit 306 and returns the results to the experiment design unit 306.

Besides interacting with the local network 102, 104, 106, each on-line simulator 206 also communicates with other simulators and exchanges the relevant network parameter information, such as network traffic models and efficient network parameters. Thus, a collaborative, scalable on-line simulation network is formed. The network is scalable in that with the addition of each additional network node 108 additional collaborative on-line simulators 206 may be added which will work in conjunction with previously existing simulators to change network parameters in real-time. Through this, each of the local on-line simulators 206 acquires a global view of the network and thus is able to perform better network simulation and control.

Since the network conditions keep changing all the time, the on-line simulation system and method also requires a fast experiment design method to quickly finish the simulation experiments and find efficient network parameter settings before the underlying network information becomes stale. The goal is to use as few experiments as possible to find as efficient a parameter setting as possible. Note that the emphasis is not on seeking the optimum setting. Instead, a best-effort strategy is adopted to find a better operating point within a limited time frame. Thus, the search and simulations can be interrupted at any time and still produce a result better than the starting point. This provides the possibility to make a compromise between the quality of the result and the search time to obtain the result. In a preferred embodiment, the Random Early Drop (RED) queuing management algorithm is used as the underlying network algorithm to be adjusted because of its sensitivity to parameter settings.

Figure 4A:
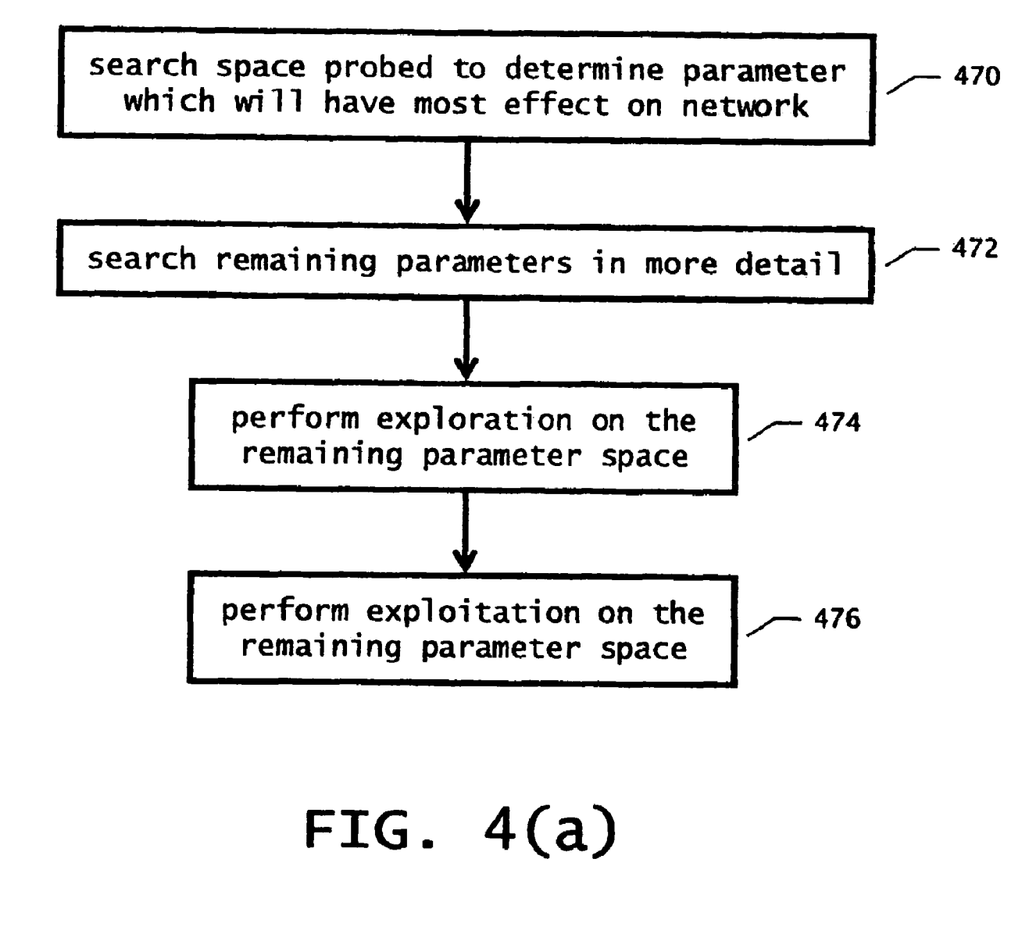
FIG. 4(a) illustrates a flowchart of the hybrid parameter searching of the present invention.

To accomplish a speedy result, the present invention implements a two-part hybrid search method in the concerned parameter space as shown in flowchart 4(a).

First a high level pruning step occurs. The search space is probed to determine the important parameters which will have the most effect on network performance (step 470). After pruning part of the search space by ignoring less important parameters, those remaining parameters are searched in more detail (step 472).

In a preferred embodiment, the high level pruning occurs as follows. The search space is probed by the on-line simulators 206 conducting simulations in portions of the parameter space, specifically the boundaries of the space. These simulations will be based upon a $2^k$ full factorial experiment design. $2^k$ full factorial design is known in the art of performance analysis.

$2^k$ full factorial design examples all possible combinations of the parameter boundaries and fits the parameter boundary results into a non-linear regression model. The model analyzes the importance of different parameters. The above method is not a iterative method. Instead, to achieve an increasingly refined result, simulations are ordered to form a series of subsets and the first subset is generated by applying $2^{k-p}$ fractional factorial design on the parameter space. "P" is the minimum integer satisfying $2^{k-p} \geq k$, which is required by the regression analysis. $2^{k-p}$ fractional factorial design is a technique which just executes part of the experiments in $2^k$ full factorial design.

By carefully selecting the simulations, the analysis of the parameter importance can be executed with improved speed with only minimum expense to accuracy. After finishing a subset of simulations and analyzing the simulation results, the next larger subset, which is obtained by using $2^{k-p+1}$ fractional factorial design, is analyzed, and so on until all $2^k$ simulations are finished. During this process, if the search is interrupted, the analysis result based on the last subset of simulations is returned as the "best-so-far" result. Thus, the network still has been tuned for better efficiency.

Second, once the high level pruning is complete, the next task is to search the remaining parameter space in detail with state space search techniques. Basically, the state space search method includes two important components: exploration and exploitation, and a balance strategy between them (steps 474 and 476). Exploration encourages the search process to examine unknown regions. Exploitation attempts to converge to a maximum or minimum in the vicinity of a chosen region.

Thus, the hybrid on-line simulation methods and system that implements the method use a best-effort strategy in its second-order control, whose emphasis is not on full optimization, but on continuously and increasingly moving the system towards a better operating point. The present invention continuously tunes up the underlying operation (albeit at a larger time-scale than their normal operation) and therefore, equips the network management infrastructure with "pro-active" management capabilities.

Figure 4B:
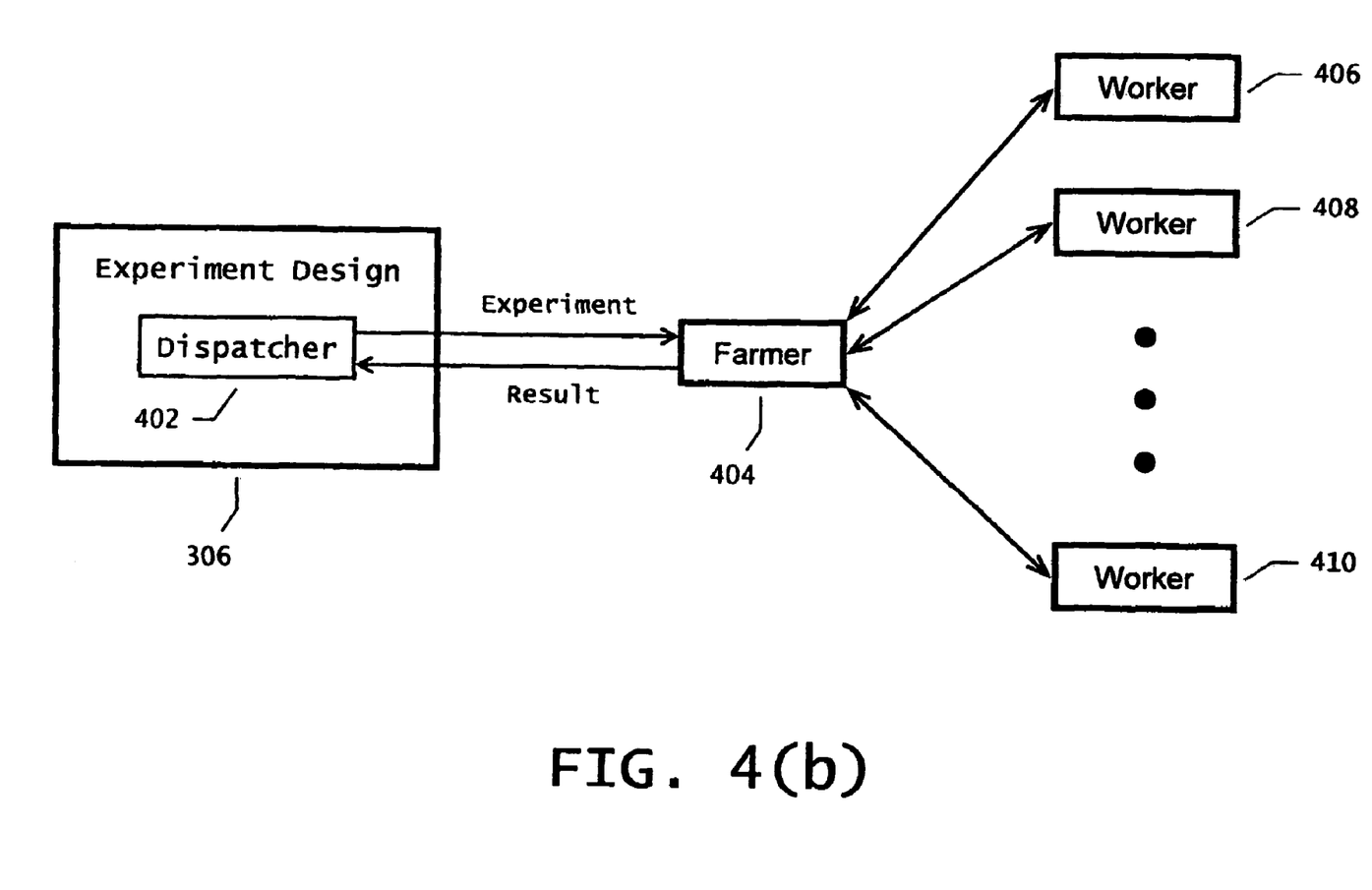
FIG. 4(b) illustrates the Farm-Worker structure of the collaborative on-line simulation system of the present invention.

In another preferred embodiment, simulation execution is sped-up using parallel execution of the simulations. FIG. 4(b) illustrates a parallel processing architecture using a farmer-worker infrastructure. The farmer-worker infrastructure of FIG. 4(b) allows for distribution of many single-machine simulations across multiple workstations. The dispatcher 402 is the interface between this distributed simulation executer (the "worker") 406, 408, 410, and the experiment design unit 306. All the simulations have to go through this dispatcher 402 which acts as an interface distributing the simulation to be distributed among the workers 406, 408, 410. The farmer 404 is the center of this infrastructure, which routes the operations of dispatcher 402 and workers 406, 408, 410. The farmer 404 may use conventional distributed network architecture queuing schemes to distribute and route simulations amongst the workers 406, 408, 410, where the workers 406, 408, 410 are the actual simulation executers. The above farmer-worker infrastructure can use multiple workers 406, 408, 410 for the same experiment design unit 306 to speed up the simulation process. In a preferred embodiment, all the communication in this scheme is through TCP connections. Therefore, the dispatchers 402, farmer 404, and workers 406, 408, 410, can be located anywhere in the network. Thus, experiments can be evenly distributed over the whole wide area network and maximize the utilization of the computing resources.

Figure 5:
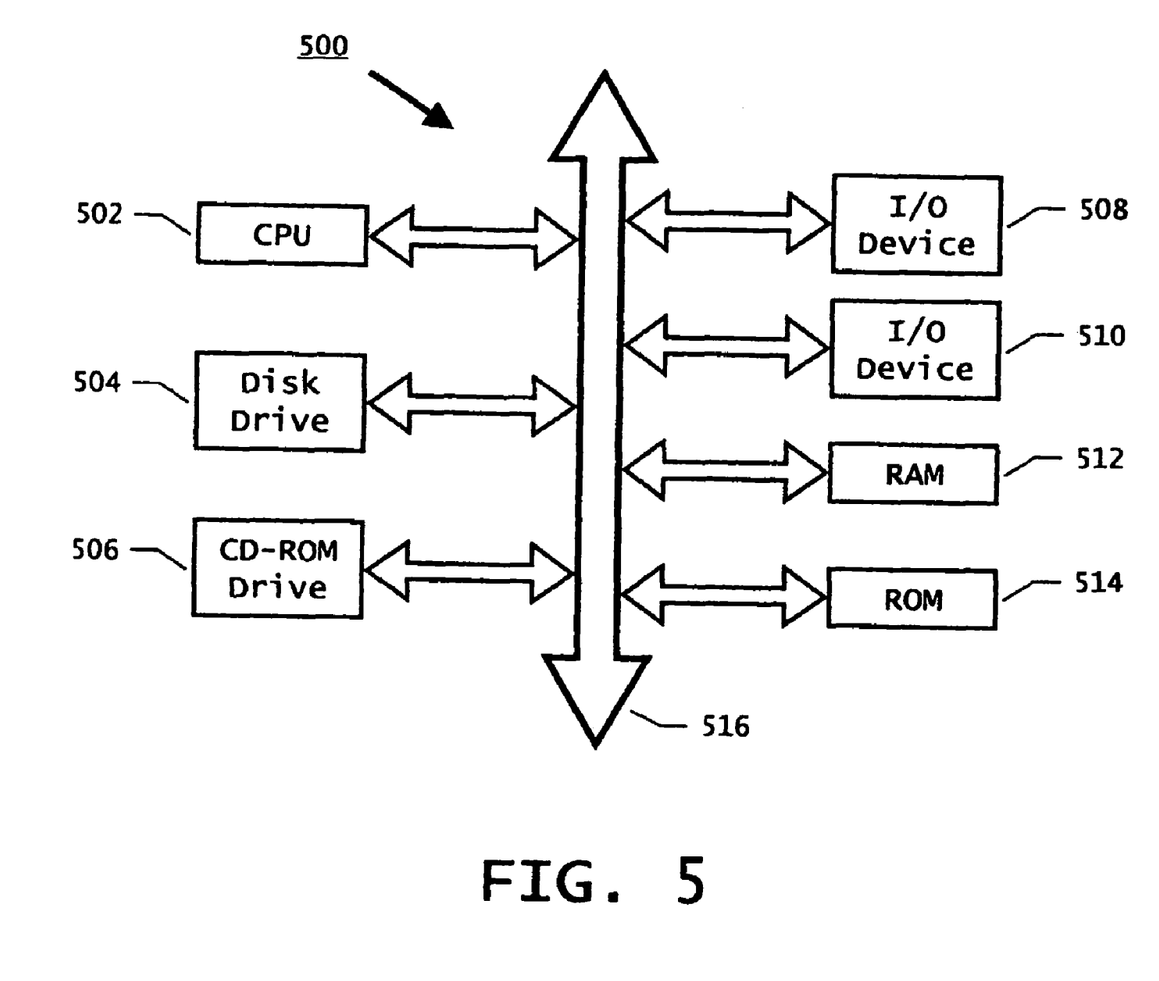
FIG. 5 illustrates a processor-based system which incorporates the collaborative on-line simulation system and method of the present invention.

Referring now to FIG. 6, each network node 102, 104 and 106 may contain a processor-based system 500 for implementing the above described system and method. The processor-based system 500 includes a central processing unit (CPU) 502, for example, a microprocessor, that communicates with one or more input/output (I/O) devices 508, 510 over a bus 516 is shown. The processor-based system 500 also includes random access memory (RAM) 512, a read only memory (ROM) 514 and may include peripheral devices such as a disk drive 504 and CD-ROM drive 506 which also communicates with CPU 502 over the bus 516. Memory 512 can be configured to store the collaborative on-line simulation system and method for the present invention as described above. It may also be desirable to integrate the processor 502 and memory 512 on a single integrated chip.

Hence, the present invention provides a system and method for improving the efficiency of a computer network by the use a on-line simulators which execute at least one simulation based upon current network conditions and tune network parameters in real time.

Although the invention has been described above in connection with exemplary embodiments, it is apparent that many modifications and substitutions can be made without departing from the spirit or scope of the invention. In particular, although the invention is described with reference to tuning network protocol parameters, the system and method can also be applied to other aspects of computer network such as routing. Likewise, the system can be implemented on a UNIX, LINUX or any other operating system. Accordingly, the invention is not to be considered as limited by the foregoing description, but is only limited by the scope of the appended claims.

What is claimed is:

1. A system for improving data network performance, the system comprising:
   a first router coupled to a first local area network;
   a first simulator coupled to the first router, the first simulator configured to receive current network parameters from the first router, perform a first network simulation based on the current network parameters, and transmit to the first router improved network parameters based on a result of the first simulation, the improved network parameters improving data network efficiency of the first local area network;
   a second router coupled to a second local area network, the second local area network being coupled to the first local area network; and
   a second simulator coupled to the second router, the second simulator configured to receive current network parameters from the second router and the improved network parameters from the first simulator, perform a second network simulation based on the current network parameters received from the second router and the improved network parameters received from the first simulator, and transmit to the second router and the first simulator additional improved network parameters based on a result of the second simulation, the additional improved network parameter improving data network efficiency of the second local area network, wherein the first router is configured to adjust at least one current network operating parameter based on the improved network parameters and the second router is configured to adjust at least one current network operating parameter based on the additional improved network parameters.

2. The system of claim 1, wherein the first and second simulators are configured to use a best-effort strategy to respectively determine the improved network parameters and additional improved network parameters within a limited time frame.

3. The system of claim 1, wherein the first and second routers are configured to implement a Random Early Drop queuing management algorithm and improve the efficiency of the algorithm based respectively on the improved network parameters and the additional improved network parameters.

4. The system of claim 1, wherein the first and second simulators are configured to perform a high level pruning step to determine which of the current network parameters received respectively from the first and second routers will have the most effect on network performance.

5. The system of claim 1, wherein the first and second simulators are configured to implement $2^k$ full factorial experiment design.

6. The system of claim 1, wherein the first simulator comprises software stored in a memory of and configured to be executed on a node of the first local area network and the second simulator comprises software stored in a memory of and configured to be executed on a node of the second local area network.

7. The system of claim 1, wherein the first and second routers are configured to continuously update current network parameters of their respective local area networks in real-time based on simulation results from the first and second simulators, respectively.

8. The system of claim 1, wherein the first and second simulators are computers coupled respectively to the first and second local area networks.

9. A method for improving performance of a data network, the method comprising:
   collecting current network parameters of a first local network by a first router coupled to the first local network;
   performing a first simulation by a first simulator coupled to the first local network based on the current network parameters of the first local network;
   replacing at least one current network parameter of the first local network with an improved network parameter based on a result of the first simulation, the improved network parameters improving data network efficiency of the first local network;
   collecting current network parameters of a second local network by a second router coupled to the second local network;
   performing a second simulation by a second simulator coupled to the second local network based on the current network parameters of the second local network and a result of the first simulation;
   replacing at least one current network parameter of the second local network with an improved network parameter based on a result of the second simulation, the improved network parameter improving data network efficiency of the second local network.

10. The method of claim 9, further comprising transmitting improved network parameters from the first simulator to the first router based on a result of the first simulation.

11. The method of claim 10, further comprising transmitting improved network parameters from the second simulator to the second router and the first simulator based on a result of the second simulation.

* * * * *